Dec. 22, 1936.  E. DELAY  2,065,432
BRAKE FOR AUTOMOBILES
Filed Sept. 16, 1935
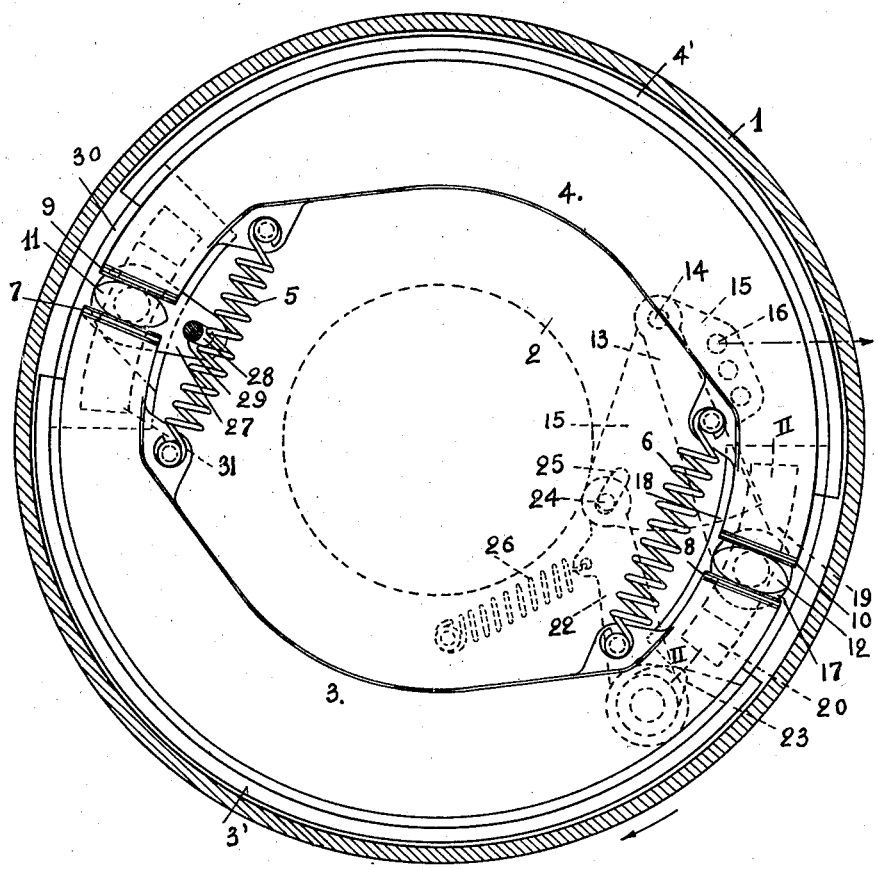
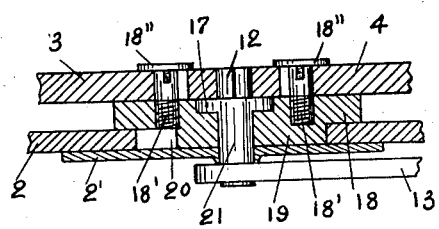
INVENTOR
Eugene Delay
By Alexander B Dowell
ATTORNEYS Patented Dec. 22, 1936

2,065,432

UNITED STATES PATENT OFFICE 2,065,432

BRAKE FOR AUTOMOBILES

Eugène Delay, Vincennes, France

Application September 16, 1935, Serial No. 40,829
In France May 8, 1935

7 Claims. (Cl. 188—78)

The present invention relates to a brake more especially applicable to automobiles.

The simplest type of brake is constituted by a drum rigidly connected to the wheel with which it rotates and on to which one or more brake shoes are applied by means of a linkage. Said system soon proved quite insufficient on the speedy or heavy vehicles which are being employed more and more in actual practice for it is impossible, by muscular effort, to develop the power necessary to obtain the vigorous application which vehicles of this kind require under certain circumstances.

Many means have been tried in order to overcome this disadvantage, servo-brakes for instance bringing into action an auxiliary source of power such as partial vacuum. But such brakes require a complicated installation which is liable to failures and, in any case, is very costly. Another solution consisted in employing self-energizing brakes, that is to say brakes in which the dragging along of the brake shoes by the drum at the moment they enter into contact with the latter sets up an increase in the braking effort. This type of brake is simple in construction and consequently low in cost, but it suffers from the disadvantage of making it impossible to obtain gradual braking. Indeed, as soon as the brake shoe touches the drum it is drawn along by said drum and tends to produce maximum braking hence causing locking of the road wheels and sometimes jamming of the brake shoes which remain in the braking position even when the control linkage is released so that it is necessary to reverse in order to release the brake.

The object of the present invention is to obviate the above disadvantages. It concerns a self-energizing brake, hence a brake which is not costly to manufacture, which nevertheless makes it possible to obtain gradual brake energization.

For this purpose, the brake according to the invention comprises two brake shoes, each of which extends approximately over one half the circumference and bears against the brake drum when the brake is applied, which are drawn along in rotation by said brake drum causing an increase in the gripping force, said brake being characterized by the fact that the drawing along of the brake shoes by the drum is adjustably limited by means of a check-cam, the positioning of which is a function of the magnitude of the travel of the brake control linkage.

According to the invention, the application of the brake shoes against the drum is effected by the action of a spacing cam which is rotated by a lever when the brake linkage is actuated and which moves the shoes apart when applying them against the drum, said spacing cam being mounted on a part which slides in a stationary plate and bears against the check cam.

At the point diametrically opposite the spacing cam, the two brake shoes likewise closely encompass a second spacing cam carried by a lever pivoted on the stationary plate, so that the drawing along of the brake shoes by the drum causes a rotation of the cam which effects the separation of the brake shoes on this side and their application against the drum.

According to a further characteristic of the invention, the lever which is rigidly connected with the first spacing cam is provided at its end with a part to which the brake linkage is secured and to which, on the other hand, is linked a lever rigidly connected with the check cam for the purpose of causing the rotation of said lever which, on the other hand, is returned to its position of rest by a spring secured thereto and to the stationary plate of the wheel.

Other advantages and peculiarities of the invention will become apparent from the following description of a form of embodiment given as an example and with reference to the attached drawing, in which:

Figure 1 is a front view of the brake according to the invention, the wheel on which it is mounted being assumed to have been removed;

Figure 2 is a section of a detail according to line II—II of Figure 1.

The brake according to the invention comprises, as is conventional, a brake drum 1 rigidly connected with the wheel to which a braking effect is to be applied and a stationary plate 2 on which are mounted the following various brake components: two brake shoes 3 and 4, each extending substantially half way round the circumference, are mounted inside drum 1 and are drawn together, that is to say away from drum 1, by the pull of springs 5 and 6. The brake shoes are provided, on their outer portion, with brake linings 3' and 4' which are brought into frictional contact with the drum in the usual manner. At both ends the edges 7, 8, 9, 10 of the brake shoes bear against spacing cams 11 and 12; cam 12 is rigidly connected to a lever 13 through a pivot pin 21 (Fig. 2). Said lever is provided at point 14 with a pin about which is pivoted a small plate 15 provided with a series of holes 16 into one of which is hooked the brake linkage leading, directly or not, to the brake pedal or to the hand-brake lever. Cam 12 is, moreover, integral with a disc 17 (see also Fig. 2) housed in a small plate 18 a projecting part 19 of which slides in a suitable recess 20 provided in stationary plate 2. Slide 18, 19 is retained in recess 20 of the plate 2 owing to the fact that on pin 21 which supports cam 12 and disc 17 is mounted a small plate 2' bearing against plate 2. On the other hand, in slide 18, 19 are fixed two pins 18', penetrating into elongated apertures provided for this purpose in brake shoes 3 and 4, and each provided with a cap 18'' bearing on said brake shoes. Said pins and accessory components have not been shown in Figure 1 for the sake of clearness.

In addition, on stationary plate 2 is pivotally mounted a lever 22 on which is mounted a check cam 23 and the other end of which is provided with a stud 24 sliding and pivoting in a slot 25 provided in part 15. Lever 22 is constantly urged towards the left, looking at the drawing, by a spring 26 attached to it on the one hand, and to plate 2 on the other hand.

Spacing cam 11, diametrically opposite cam 12 is mounted on a part 27 forming a lever and provided with a slot 28 into which nests a stud 29 supported by plate 2 at a point adjacent the cam 11. Lever 27 is thus able to pivot about stud 29 which is offset from the center of the drum, and at the same time to slide on said stud to a certain extent.

The upper portion of lever 27 is substantially circular in shape and plays the same part as disc 17. It is mounted in a slide 30 similar to 18 likewise sliding in recesses provided in stationary plate 2 by means of a projecting part 31 similar to 19. The mounting of said part is moreover the same as that of 18, 19 with respect to the plate and brake shoes.

The device operates as follows:

When running forward, the wheel, together with drum 1, rotates in the direction shown by the arrow Fig. 1. When at rest, all the components are positioned as shown in Fig. 1 of the drawing. If the brake is actuated, part 15 is pulled in the direction of the arrow, Fig. 1. Owing to this fact, pivotal point 14 of lever 13 is moved towards the right, looking at the drawing, which causes rotation of the lever about the centre of cam 12, thus causing the rotation of said cam with which it is rigidly connected. The rotation of said cam causes the two brake shoes 3 and 4 to move apart thus applying them against brake drum 1. As the brake shoes are pressed against the drum they tend to be drawn along by said drum. Owing to this pull, cam 11 which is also drawn along tends to cause lever 27 to pivot about stud 29 which as previously stated is offset from the center of the drum. As a consequence, cam 11 assumes an oblique position in relation to the brake shoes causing the separation of the two brake shoes 3 and 4 and the greater the movement is, the further the two brake shoes move apart so that in reality the brake shoes have a tendency to bear more and more heavily against the brake drum. It should be noted, moreover, that the movement of the brake shoes relative to the two cams 11 and 12 is possibly due to the fact that the cams are supported by slides 18, 19 and 30, 31, which are adapted to slide in the stationary plate 2.

However, this movement of the slides is limited owing to the fact that slide 18 abuts against check cam 23. Said cam has itself rotated with lever 22, with which it is rigidly connected, when part 15 was pulled, when braking. Consequently, the movement of the shoe in the direction of the rotation of the drum, that is to say, in reality, the intensity of braking, depends on the magnitude of the rotational movement given to check cam 23, that is to say on the quantity by which the brake linkage has been actuated. It will be noticed that, at this moment, if a further pull is applied to the brake linkage, that is to say on part 15, lever 13 cannot rotate further since cam 12 is locked between the brake shoes which cannot move apart. Part 15 therefore pivots at 14 on lever 13, acting on lever 22 which rotates as well as check cam 23 thus permitting of a further movement of the brake shoes, in other words, an increase in self-energized braking.

It will therefore be seen that in this manner self-energized braking is duly obtained by the drawing along of the brake shoes by the drum at the moment said shoes are brought into contact with the brake drum, on the initiation of braking and that the intensity of said self-energization is a function of the quantity by which the brake linkage has been moved which is, in effect, the result sought for.

It should, moreover, be noted that, after a braking period, the moment the linkage is no longer actuated, part 15 returns towards the left, causing lever 14 to pivot together with cam 12, the two brake shoes are immediately drawn together under the action of spring 6 which causes the slackening of the brake, even before the brake shoes, which had been drawn along by the drum, have returned to their starting position. This is possible, owing to the fact that stud 24, which is rigidly connected with lever 22, slides in slot 25 of part 15, so that said part 15 is capable of movement as above set forth without, however, bringing back with it lever 22 and cam 23, said return movement only occurring later under the action of spring 26.

As shown in the drawing, a certain number of holes 16 are provided in part 15 and, as has been seen, the brake linkage is attached to one of said holes. According to the hole employed for attaching the brake linkage, the initial braking action is exerted to a greater extent on one or the other of the two levers 13 or 22. Indeed, if upper hole 16 is employed, the travel of the linkage is transmitted at the start, more especially to lever 13 and only slightly to lever 22. The reverse occurs when lower hole 16 is utilized. It is thus possible to make an adjustment between direct braking and self-energized braking which may be of interest according to the quality of the brake shoe linings.

Whereas, in the braking systems used hitherto, in which the brake shoes are applied on the drum by pivotal movement, the brake linings wear very unevenly, some parts becoming completely worn, leaving the metal of the shoe bare while other portions are still almost intact, the brake according to the invention offers the accessory advantage that, owing to the action of cams 11 and 12, the brake shoes move concentrically in relation to the drum and consequently make contact with said drum simultaneously over the whole of their periphery.

The foregoing detailed description and drawing have been given for clearness of understanding only, and no unnecessary limitations should be understood therefrom, and changes in the form and details may be made by those skilled in the art without departing from the spirit of the invention, the invention being limited only as indicated by the scope of the following claims.

I claim:

1. A brake for automobiles comprising a drum, a stationary plate, shoes supported by said stationary plate, brake control linkage for applying the shoes, said shoes extending altogether substantially over the whole circumference of said drum and bearing against the brake drum when the shoes are applied, said shoes being drawn along in rotation by said brake drum causing an increase in the power of the grip, a check cam separate from the applying linkage for adjustably limiting the drawing along of the brake shoes, said check cam being pivoted on said stationary plate, and the positioning of the check cam being a function of the magnitude of the movement caused to the linkage.

2. A brake for automobiles comprising a drum, a stationary plate, two shoes supported by said stationary plate, brake control linkage for applying the shoes, each shoe extending approximately over a half of the circumference of said drum and bearing against the brake drum when the shoes are applied, said shoes being drawn along in rotation by said brake drum causing an increase in the power of the grip, a check cam separate from the applying linkage for adjustably limiting the drawing along of the brake shoes, said check cam being pivoted on said stationary plate, and the positioning of the check cam being a function of the magnitude of the movement caused to the linkage.

3. A brake according to claim 1, comprising a spacing cam disposed between two of the brake shoes and rotating when the brake linkage is actuated, this rotation moving said shoes apart and applying them against the drum.

4. A brake according to claim 1, comprising a spacing cam disposed between two of the brake shoes and rotating when the brake linkage is actuated, this rotation moving said shoes apart and applying them against the drum, said spacing cam being mounted on a part sliding in said stationary plate and whose motion is limited by the said check cam.

5. A brake according to claim 1, comprising a spacing cam disposed between two of the brake shoes, a lever rigidly connected to said spacing cam, said lever and said cam being rotated when the brake linkage is actuated, this rotation moving said shoes apart and applying them against the drum.

6. A brake according to claim 1, comprising a spacing cam disposed between two of the brake shoes, a lever rigidly connected to said spacing cam, said lever and said cam being rotated when the brake linkage is actuated, this rotation moving said shoes apart and applying them against the drum, a part supported by said lever and on which is fixed the brake linkage, a lever rigidly connected to the check cam, said latter lever being connected to said part which controls the rotation of said lever and said check cam, a spring connected to said plate and to said last lever returning this latter to its position of rest when it is not actuated by said part.

7. A brake according to claim 2, comprising, between two consecutive shoes, excepting at the point where the spacing cam is located, other spacing cams each being supported by a lever pivoting on said stationary plate whereby the pull of the drum on the brake shoes causes the rotation of the corresponding spacing cam, thus further increasing the spacing apart of the brake shoes and their pressure against the drum.

EUGÈNE DELAY.